US010721626B2

(12) United States Patent
Barberis et al.

(10) Patent No.: US 10,721,626 B2
(45) Date of Patent: Jul. 21, 2020

(54) METHOD AND SYSTEM FOR LIMITING COLLISIONS IN CELLULAR NETWORKS

(71) Applicant: TELECOM ITALIA S.p.A., Milan (IT)

(72) Inventors: Sergio Barberis, Turin (IT); Giorgio Calochira, Turin (IT); Flavio Muratore, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 129 days.

(21) Appl. No.: 15/781,354

(22) PCT Filed: Dec. 23, 2015

(86) PCT No.: PCT/EP2015/081149
§ 371 (c)(1),
(2) Date: Jun. 4, 2018

(87) PCT Pub. No.: WO2017/108127
PCT Pub. Date: Jun. 29, 2017

(65) Prior Publication Data
US 2018/0367999 A1 Dec. 20, 2018

(51) Int. Cl.
*H04W 16/10* (2009.01)
*H04W 72/04* (2009.01)
(Continued)

(52) U.S. Cl.
CPC .......... *H04W 16/10* (2013.01); *H04W 64/00* (2013.01); *H04W 72/0453* (2013.01); *H04W 72/082* (2013.01); *H04W 72/048* (2013.01)

(58) Field of Classification Search
CPC ............. H04W 16/10; H04W 72/0453; H04W 72/082; H04W 36/20; H04W 72/1231
See application file for complete search history.

(56) References Cited

U.S. PATENT DOCUMENTS 8,938,022 B2 * 1/2015 Yokoyama ............. H04J 11/003
370/310
2015/0003322 A1 * 1/2015 Pyattaev ........... H04W 28/0221
370/328
(Continued)

FOREIGN PATENT DOCUMENTS

WO WO 2014/124024 A2 8/2014
WO WO 2014/124024 A3 8/2014
WO WO 2014/124048 A1 8/2014

OTHER PUBLICATIONS

Chen et al, "Clustering for Interference Alignment in a Multiuser Interference Channel", IEEE 2012 (Year: 2012).*

(Continued)

*Primary Examiner* — Omer S Mian
(74) *Attorney, Agent, or Firm* — Oblon, McClelland, Maier & Neustadt, L.L.P.

(57) ABSTRACT

A method assigning frequency bands on a cellular network including plural network nodes each configured to activate transmission links between pairs of corresponding network nodes to exchange traffic. The method includes, in response to assessment of a new transmission link to be activated between first and second network nodes: retrieving an indication of coordinates of first and second network nodes within a geographical area; retrieving an indication of resource sharing clusters, of the cellular network, each including a group of transmission links considered to potentially cause transmission collisions; selecting a set of the resource sharing clusters according to a comparison of coordinates of the first network node with coordinates of the network nodes corresponding to the transmission links of the resource sharing clusters; if the selected set of resource sharing clusters is not empty, carrying out operations including: activating a new transmission link by exploiting an assigned frequency band.

9 Claims, 5 Drawing Sheets

(51) Int. Cl.
  *H04W 72/08* (2009.01)
  *H04W 64/00* (2009.01)

(56) References Cited

U.S. PATENT DOCUMENTS

| | | |
|---|---|---|
| 2015/0245234 A1 | 8/2015 | Roy et al. |
| 2015/0373572 A1* | 12/2015 | Sahin ................ H04W 72/1231 370/252 |
| 2015/0373618 A1 | 12/2015 | Deenoo et al. |
| 2016/0021526 A1* | 1/2016 | Niu .................... H04L 61/2564 370/230 |
| 2016/0183232 A1* | 6/2016 | Stirling-Gallacher ...................... H04W 72/1226 370/280 |

OTHER PUBLICATIONS

International Search Report and Written Opinion dated Sep. 21, 2016, in PCT/EP2015/081149 filed Dec. 23, 2015.

* cited by examiner

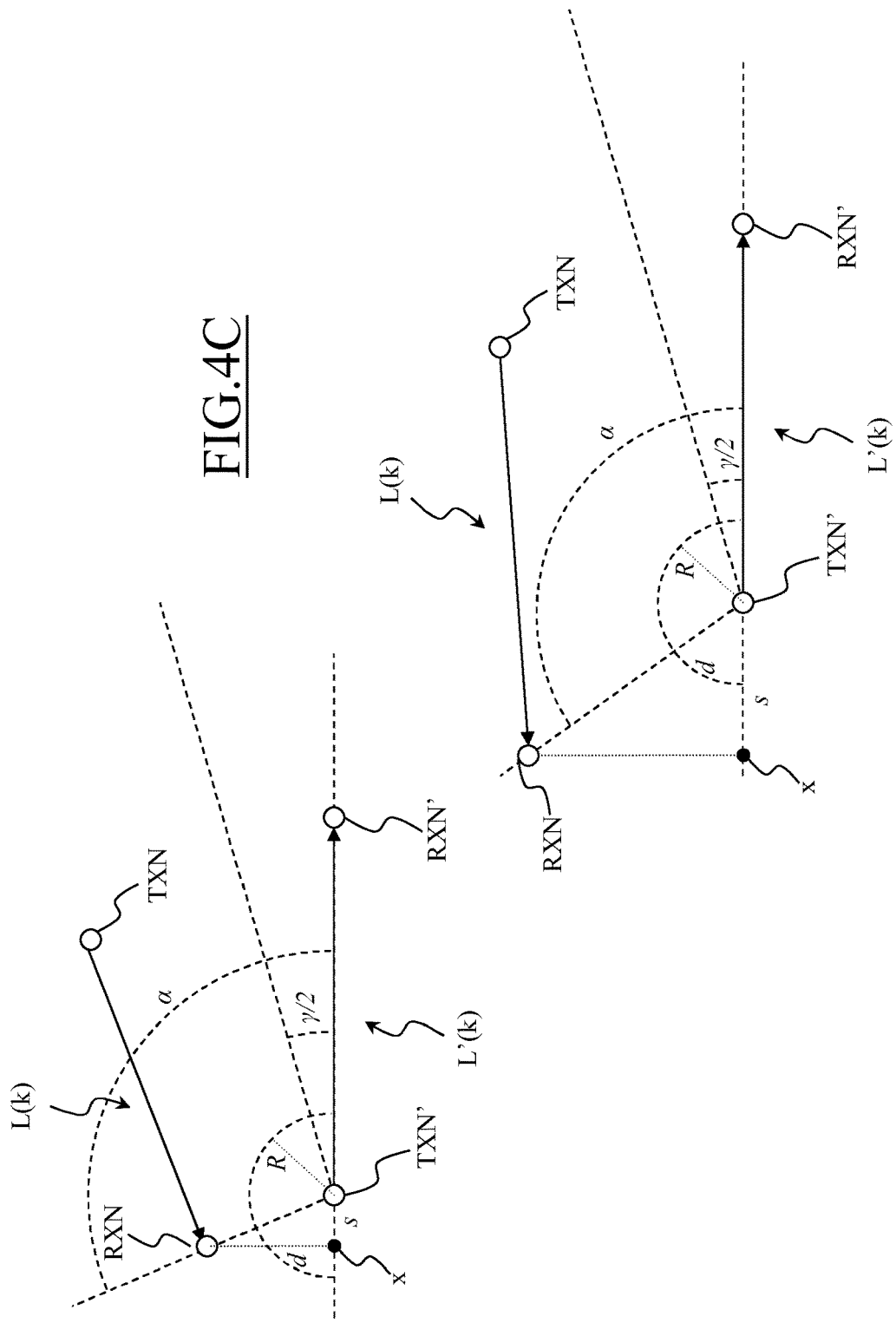

METHOD AND SYSTEM FOR LIMITING COLLISIONS IN CELLULAR NETWORKS

BACKGROUND OF THE INVENTION

Field of the Invention

The present invention generally relates to wireless communication networks, such as cellular networks.

Overview of the Related Art

Evolution of cellular networks has experimented a significant growth in terms of number of users and performance, and has recently brought to the development of new scenarios providing the deployment of cellular networks comprising heterogeneous and dense network nodes using multiple frequency bands, such as the network proposed in the 5G (5th Generation) research groups ICT-317669-METIS/D6.6, "Final report on the METIS 5G system concept and technology roadmap", 30 Apr. 2015, and NGMN Alliance, "NGMN 5G White Paper", 17 Feb. 2015.

In order to increase the overall capacity of said cellular networks, network nodes should be designed to operate also at frequencies much higher than those currently exploited by cellular networks. A particularly interesting frequency range that should allow the achievement of high peak bit rates, such as 10 Gbit/s, is the mm-wave frequency range. For example, network nodes may be designed to operate at a frequency of 60 GHz, where there is more spectral availability and the communications may exploit channels with wider bandwidth. Spectrum in mm-wave bands may be advantageously used to guarantee extreme broad-band mobile services access as well as wireless back-hauling/front-hauling solutions when needed (typically in hotspots and dense small cell deployments).

In the currently available cellular networks, such as the ones complying with the 3GPP LTE/LTE-Advanced standard, data is allowed to be high-speed conveyed between a fixed-location transceiver base station (e.g., eNodeB) radiating radio waves over a respective coverage area (cell) and mobile user equipment (e.g., user terminals, such as cellular phones) within the coverage area. Therefore, a clear distinction occurs between fixed network nodes (the base stations) and mobile network nodes (the user equipment).

Conversely, in future 5G cellular networks, the network nodes classical distinction between base station and user equipment is expected to be less noticeable due to a widespread use of D2D (device-to-device) communication/relaying (see for example ICT-317669-METIS/D6.6, "Final report on the METIS 5G system concept and technology roadmap" 30 Apr. 2015, sect. 2.1.1).

Consequently, a new dynamic cellular network will be composed by moving and appearing/disappearing nodes, which is able to manage new services by using the extreme broad band of mm-wave communication for access or backhauling purposes (e.g., vehicular and nomadic node services, DL caching or UL aggregation of contents in clusters, and so on).

Due to the peculiar characteristics of radio propagation at mm-wave frequencies, highly directional antenna systems should be provided in order to compensate the high pathloss associated to said bands. As a consequence, the communication among network nodes at mm-wave frequencies becomes more similar to a point to point communication. In such a scenario, by taking into account—in addition to the high pathloss—also the isolation introduced by the obstacles or walls, a cellular network adapted to operate at mm-wave frequency is expected to be more noise limited rather than interference limited (on this regard, see S. Rangan et al., "Millimeter Wave Cellular Wireless Networks: Potentials and Challenges", arXiv:1401.2560v1 [cs.NI] 11 Jan. 2014).

Despite of this, even though mm-wave communication seems to have a lower probability to experience interference compared with the communication in current cellular networks, in case of such an event the impairment could be very severe.

It is therefore desirable to identify in advance situations of potential mutual interference among intra system communications in order to take appropriate counteractions aiming at avoiding/mitigating the problem (i.e., specific scheduling and resource sharing criteria).

M. Park et al., "Interference Mitigation Techniques in 60 GHz Wireless Networks", IEEE Communications Magazine, Vol. 47, n. 12, December 2009, faces the problem of interference in a dense environment. Said paper evaluates and compares PHY (PHYsical) layer and MAC (Media Access Control) interference mitigation techniques in terms of performance and coordination required among interfering networks deployed at 60 GHz unlicensed bands.

J. R. Barr, "Efficient Methods for Coexistence with other 60 GHz Systems", Doc. IEEE 802.11-10/0231r3, 16 Mar. 2010 proposes, as a solution for simple coexistence methods among systems operating at 60 GHz, to perform a scan operation before using a channel in order to check if it is already in use.

S. Singh, "Interference Analysis for Highly Directional 60-GHz Mesh Networks: The Case for Rethinking Medium Access Control", IEEE/ACM Transactions on Networking, Vol. 19, n. 5, October 2011, relates to spatial interference statistic for multi-gigabit outdoor mesh networks operating in the unlicensed 60 GHz band. Said paper focuses on MAC design issues and provides an analytical framework for determining the collision probability in such networks as a function of antenna patterns and density of simultaneous transmitting nodes.

US 2014/0370925 discloses a millimeter-wave wireless point-to-point or point-to-multipoint communication network in which the different atmospheric absorption rates of different millimeter-wave frequencies are exploited to improve communication performance of the entire system. The network comprises one or more communication systems operating at a millimeter-wave frequency, in which each system is comprised of at least one or more point-to-point or point-to-multipoint radio transceivers. In various embodiments, the different atmospheric absorption rates of different millimeter-wave frequencies are used to reduce electromagnetic interference, to compensate for changing path-loss conditions, and/or to optimize inter-link interferences to enhance communication performance.

SUMMARY OF INVENTION

The Applicant has recognized that none of the abovementioned prior art documents relating to communication networks adapted to operate in the mm-wave band is capable of efficiently identifying in advance situations of potential mutual interference among intra system communications.

In view of the above, the Applicant has tackled the problem of carrying out preemptive identification of situations in which mutual interference among intra system communications can occur, in order to limit transmission collisions—intended as transmissions creating a so high mutual interference that communications are severely impaired—and to limit the consequent signaling overhead that would be required to solve such drawback.

This is obtained in the proposed solution by means of a geometrical-based interference analysis that is designed to determine, prior to the establishment of a new transmission link, an interference set of mm-wave transmission links comprising potentially interfering transmission links and to allow the cellular network to implement a suitable resource partitioning mechanism (e.g., a time-division multiplexing) between the new transmission link and the potentially colliding transmission links comprised in the interference set, or take alternative measures, such as establishing a transmission link on a lower frequency. The interference sets are properly revised periodically or on an event-trigger basis.

An aspect of the present invention relates to a method for assigning frequency bands on a cellular network deployed in a geographical area. The cellular network comprises a plurality of network nodes each one equipped with at least one antenna having a corresponding radiation pattern and being configured to activate transmission links between pairs of corresponding network nodes to exchange traffic.

The method comprises, in response to the assessment of a new transmission link to be activated between a first network node and a second network node, carrying out the following sequence of operations:
  retrieving an indication of coordinates of the first and second network nodes within the geographical area;
  retrieving an indication of resource sharing clusters of the cellular network, each resource sharing cluster comprising a group of transmission links considered as potentially cause of transmission collisions to each other;
  selecting a set of the resource sharing clusters according to a comparison of the coordinates of the first network node with the coordinates of the network nodes corresponding to the transmission links of the resource sharing clusters;
  if the selected set of resource sharing clusters is not empty, carrying out the following operations a)-c):
    a) identifying possible transmission collisions between the new transmission link and the transmission links of the selected set of resource sharing clusters according to a comparison of the coordinates of the network nodes corresponding to the transmission links of the selected set of resource sharing clusters with the radiation pattern of the first network node;
    b) assigning one of the frequency bands to the new transmission link according to the identification of the possible transmission collisions;
    c) activating the new transmission link by exploiting the assigned frequency band.

According to an embodiment of the present invention, if the selected set of resource sharing clusters is not empty, and a possible transmission collision is identified between the new transmission link and a transmission link of a selected resource sharing cluster of the selected set of resource sharing clusters, the method further comprises inserting the new transmission link in said selected resource sharing cluster.

According to an embodiment of the present invention, if the selected set of resource sharing clusters is not empty, and a possible transmission collision is identified between the new transmission link and a transmission link of a selected resource sharing cluster of the selected set of resource sharing clusters, said assigning one of the frequency bands to the new transmission link comprises assigning said frequency band by sharing it with the transmission links of the selected resource sharing cluster.

According to an embodiment of the present invention, if one of the following two conditions i), ii) is verified:
  i) the selected set of resource sharing clusters is empty,
  ii) the selected set of resource sharing clusters is not empty, but no possible transmission collision is identified,
the method further comprises generating a new resource sharing cluster comprising the new transmission link.

According to an embodiment of the present invention, if one of the conditions i), ii) is verified, the method further comprises:
  assigning an available frequency band among the frequency bands to the new transmission link, and
  activating the new transmission link by exploiting the assigned frequency band.

According to an embodiment of the present invention, each pair of network nodes corresponding to a transmission link comprises a transmitting node and a receiving node, said first network node being a transmitting node and said second network node being a receiving node.

According to an embodiment of the present invention, said comparison of the coordinates of the network nodes corresponding to the transmission links of the selected set of resource sharing clusters with the radiation pattern of the first network node comprises, for at least one of the transmission links of the selected set of resource sharing clusters:
  calculating a first distance between the receiving node corresponding to said transmission link and a straight line connecting the first network node with the second network node;
  comparing said first distance with an interference distance threshold;
  identifying a possible transmission collision based on said comparison between the first distance and the interference distance threshold.

According to an embodiment of the present invention, the method further comprises calculating said interference distance threshold based on:
  a second distance between the first network node and a projection of the receiving node corresponding to the transmission link on the straight line connecting the first network node and the second network node;
  a directivity of the antenna of the first network node;
  a directivity of the antenna of the receiving node corresponding to the transmission link.

According to an embodiment of the present invention, said frequency bands comprise at least one frequency band corresponding to the mm-wave frequency range.

According to an embodiment of the present invention, the network nodes of the plurality of network nodes comprise fixed transceiver stations and mobile user equipment.

Another aspect of the present invention relates to a cellular network deployed in a geographical area. The cellular network comprises a plurality of network nodes each one equipped with at least one antenna having a corresponding radiation pattern and being configured to activate transmission links between pairs of corresponding network nodes to exchange traffic. The cellular network further comprises a controller module configured to carry out the following sequence of operations in response to the assessment of a new transmission link to be activated between a first network node and a second network node:
  retrieving an indication of coordinates of the first and second network nodes within the geographical area;

retrieving an indication of resource sharing clusters of the cellular network, each resource sharing cluster comprising a group of transmission links considered as potentially cause of transmission collisions to each other, selecting a set of the resource sharing clusters according to a comparison of the coordinates of the first network node with the coordinates of the network nodes corresponding to the transmission links of the resource sharing clusters;

if the selected set of resource sharing clusters is not empty, carrying out the following operations a)-c):

a) identifying possible transmission collisions between the new transmission link and the transmission links of the selected set of resource sharing clusters according to a comparison of the coordinates of the network nodes corresponding to the transmission links of the selected set of resource sharing clusters with the radiation pattern of the first network node;

b) assigning one of the frequency bands to the new transmission link according to the identification of the possible transmission collisions;

c) activating the new transmission link by exploiting the assigned frequency band.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein:

FIG. 1 schematically shows a decoupled network;

FIGS. 4A-4D illustrate four different cases that may occur when a transmission link is geometrically compared with another transmission link according to an embodiment of the present invention.

DETAILED DESCRIPTION OF PREFERRED EMBODIMENTS OF THE INVENTION

Figure 1:
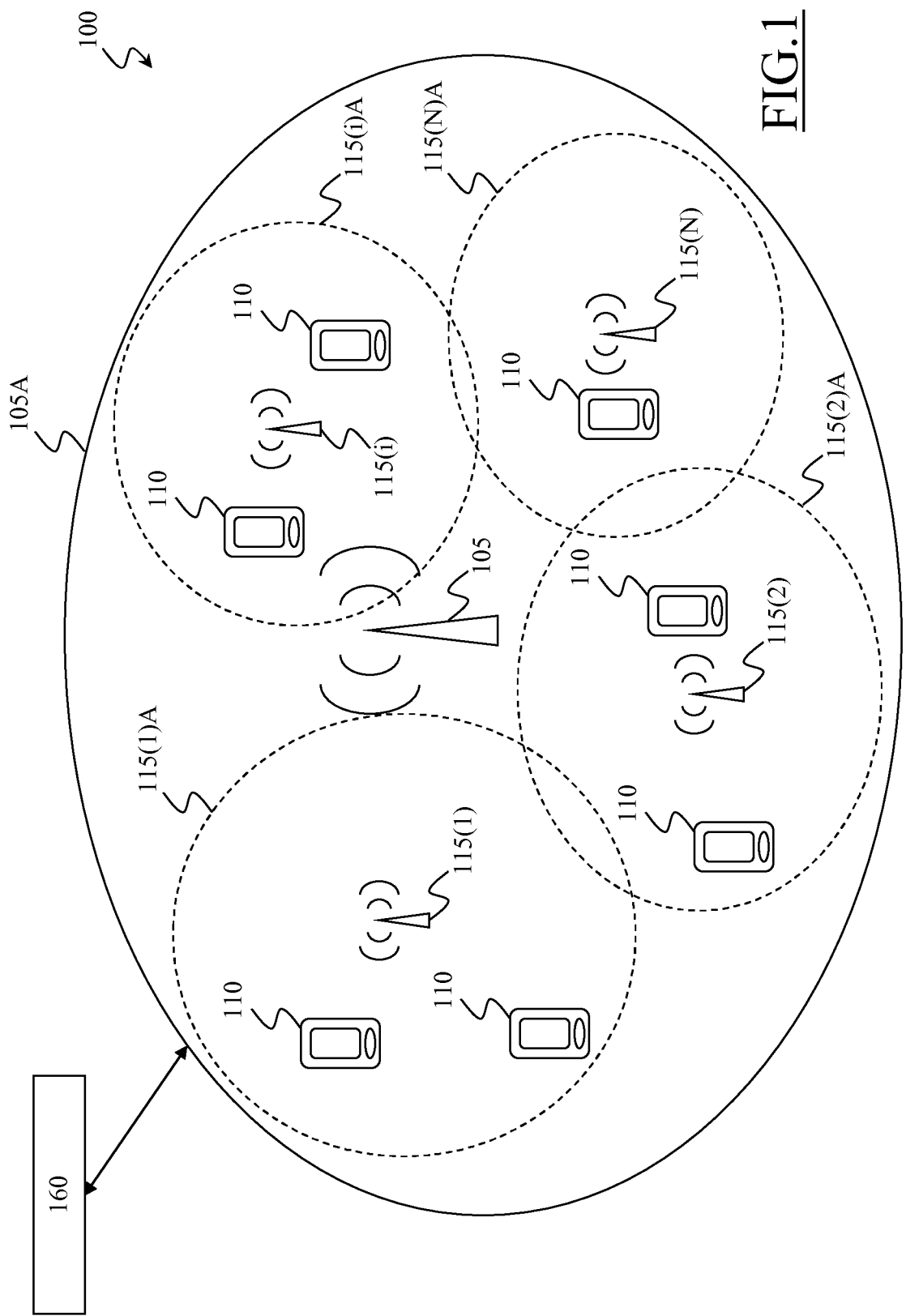

Generally, a cellular network may be regarded as formed by two sections, referred to as control plane (briefly, "C-plane") and user plane (briefly, "U-plane"). The C-plane is the section of the cellular network directed to manage the signaling information traffic, while the U-plane is the section of the cellular network that is directed to manage the user information traffic.

In current cellular networks, signaling information traffic (or simply "signaling traffic") and user information traffic (or simply "user traffic") are usually managed as a single entity. In this case, the separation between the C-plane and the U-plane mainly occurs at logical level only. Each base station of these cellular networks, regardless of the size of its corresponding coverage area, is configured to manage—within its coverage area and for each user equipment in said coverage area—both signaling and user traffic. Therefore, signaling information and user information may be transmitted/received by a same network base station, for example by exploiting different time and/or frequency resources.

In order to improve the efficiency and the reliability of the cellular networks, studies have been recently carried out to provide network architectures in which the C-plane and the U-plane are decoupled both at logical and physical levels, to allow that signaling traffic travels separated from user traffic. For the sake of brevity, a cellular network of this type will be now on referred to as "decoupled network". The base stations of a decoupled network may belong to a first category, associated to the C-plane, or to a second category, associated to the U-plane. The base stations of the first category, also referred to as "C-plane nodes"—usually implemented by the macro nodes of the network—are responsible for the C-plane coverage, and are specialized to mainly manage signaling traffic. The base stations of the second category, also referred to as "U-plane nodes"—usually implemented by the small nodes of the network—are instead responsible for the U-plane coverage, and are specialized to mainly manage user traffic. The coverage area size of each C-plane node is in general larger than the coverage area size of each U-plane node. The coverage areas of all the C-plane nodes of the decoupled network cover (with possible overlapping) portions of the territory in which the decoupled network is located. U-plane nodes are located within the coverage area of each C-plane node of the decoupled network, with the coverage areas of said U-plane nodes that cover (with possible overlapping) at least portions of the territory covered in turn by the coverage area of the corresponding C-plane node. From now on, when a user equipment is said to be within the coverage area of a C-plane node, it means that said user equipment is under the control of said C-plane node and is capable of exchanging signaling traffic therewith. Similarly, when a user equipment is said to be within the coverage area of a U-plane node, it means that said user equipment is in condition to establish a link to said U-plane node and is capable of exchanging user traffic therewith.

In the present description, reference will be made to a decoupled network, however the concepts of the present inventions can be applied both to decoupled networks as well as to cellular networks in which signaling traffic and user traffic are managed as a single entity.

With reference to the drawings, a decoupled network 100 is schematically illustrated in FIG. 1. The network 100 comprises a plurality (only one depicted in the figure) of wide coverage transceiver or base stations, referred to as C-plane nodes 105. Each C-plane node 105 is configured to provide radio coverage over a relatively wide geographic area, referred to as coverage area 105A, for allowing user equipment 110 (e.g., mobile phones) within the coverage area 105A to exchange signaling traffic with the C-plane node 105. Although not illustrated in the figures, each C-plane node 105 may comprise a set of (e.g., three) antennas, each one configured to provide radio coverage over a portion—referred to as sector—of the coverage area 105A.

As depicted in the figure, the network 100 also comprises a number N of smaller coverage base stations, referred to as U-plane nodes 115($i$) ($i$=1, 2, . . . N) located within the coverage area 105A of each C-plane node 105. Each U-plane node 115($i$) is typically configured to provide radio coverage over a relatively small geographic area, referred to as coverage area 115($i$)A, for allowing user equipment 110 within the coverage area 115($i$)A to exchange user traffic with the U-plane node 115($i$). The coverage areas 115($i$)A of said U-plane nodes 115($i$) can cover (with possible overlapping) at least portions of the geographic area covered in turn by the coverage area 105A of the corresponding C-plane node 105.

Each C-plane node 105 is configured to carry out in its corresponding coverage area 105A several signaling functions, such as beacon, common signaling management, mobility management, and routing of the user traffic toward the U-plane nodes 115(i) located within its coverage area 105A. Each C-plane node 105 is also configured to route user traffic to the most suitable U-plane node 115(i) among those in its coverage area 105A to optimize user experience. Additionally, each C-plane node 105 is configured to manage the signaling traffic pertaining to the user equipment 110 within its coverage area 105A, independently of the technology used by the U-plane nodes 115(i) to exchange user traffic data. Signaling traffic pertaining to a moving user equipment 110 whose location is crossing the border of the coverage area 105A of a C-plane node 105 is exchanged with an adjacent C-plane node 105 through procedures similar to those of a traditional handover, in this case limited to the signaling traffic. The new C-plane node 105 will then route the user traffic to the most suitable U-plane nodes 115(i) among those within its coverage area 105A to optimize user experience.

Each U-plane node 115(i) is configured to handle in uplink and in downlink the user traffic generated by the user equipment 110 within its coverage area 115(i)A. Additionally, each U-plane node 115(i) may be able to perform very limited signaling functions, such as for example the ones relating to the power management, the sustenance of the traffic link with the user equipments 110, and/or the acknowledge of messages associated with retransmissions.

The abovementioned network 100 is a two-level network, with a first level comprising nodes directed to carry out C-plane managing functions (i.e., the C-plane nodes 105), and a second level comprising nodes directed to carry out U-plane managing functions (i.e., the U-plane nodes 115(i)). However, similar considerations apply if the network 100 comprises more than two levels, for example a first level comprising wide coverage area nodes directed to carry out C-plane managing functions, a second level comprising medium coverage area nodes directed to carry out U-plane managing functions, and a third level comprising small coverage area nodes directed to carry out U-plane managing functions.

With reference 160 there is illustrated the Operations & Maintenance (O&M) system of the network 100 directed to the management of the network nodes.

According to an embodiment of the present invention, the C-plane nodes 105, the U-plane nodes 115(i), and the user equipments 110 may be equipped with hardware designed to carry out transmissions at the mm-wave frequency range, such as at 60 GHz. The C-plane nodes 105, the U-plane nodes 115(i), and the user equipments 110 may also be equipped with standard hardware designed to allow transmission at frequencies lower than the frequencies of the mm-wave frequency range.

Figure 2:
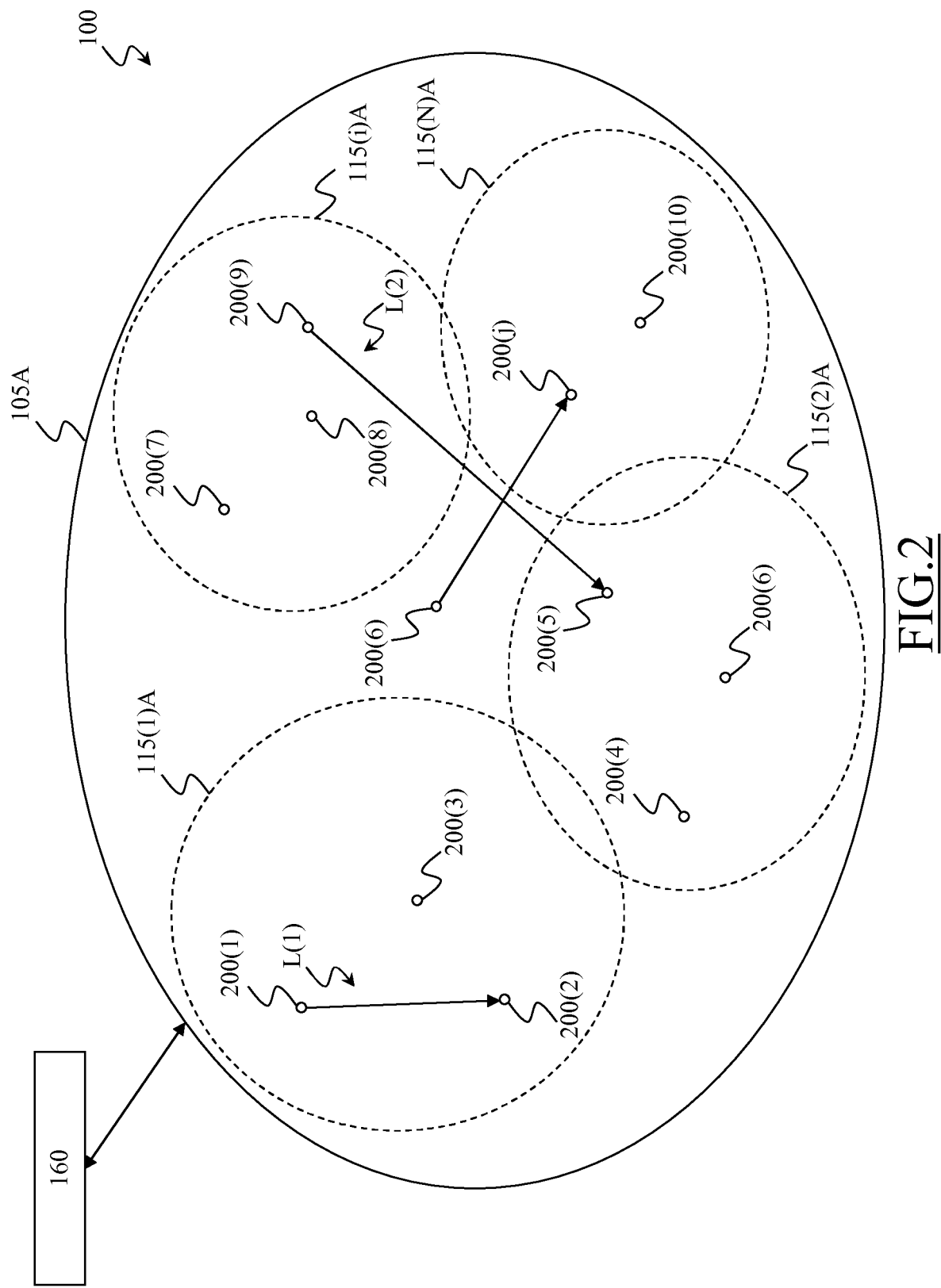
FIG. 2 illustrates the decoupled network of FIG. 1 with the C-plane nodes, U-plane nodes and user equipments thereof that are depicted as generic network nodes.

As already mentioned in the introduction of the present invention, in a cellular network exploiting the mm-wave frequency range, the network nodes classical distinction between base station and user equipment would be less noticeable. Therefore, for the purpose of the present invention, the C-plane nodes 105, the U-plane nodes 115(i), and the user equipments 110 of network 100 hereinafter will be treated as generic "network nodes", identified with reference 200(j) (j=1, 2, . . . ) (see FIG. 2).

According to an embodiment of the present invention, the mobile network 100 has to be aware of the location of all the network nodes 200(j) at any time regardless of their mobility (i.e., both of the C-plane nodes 105 and of the U-plane nodes 115(i), which have a position that is fixed in time, as well as of the user equipments 110, whose positions may generally change in time).

For this purpose, according to an embodiment of the present invention, localization data relating to the two-dimensional coordinates of the network nodes 200(j) within the geographical area wherein the network 100 is deployed may be provided to the network 100 (e.g., through the Radio Resource Management functionality of a C-plane node 105 or of an U-plane node 115(i)) by means of one or more of the known localization systems, such as for example GPS (Global Positioning System), Naystar, Glonass or Galileo satellite geo-positioning system. According to another embodiment of the present invention, the network 100 may be also provided with localization data relating to the three-dimensional coordinates of the network nodes 200, for example by combining the two-dimensional coordinates obtained by one or more of the abovementioned localization systems with information provided by maps, altimetry sensors and/or location data stored in the O&M system 160 for fixed nodes as C-plane nodes 105 and U-plane nodes 115(i).

According to an embodiment, said localization data may be managed and stored by the network 100 locally, such as for example at the network nodes 200(j) corresponding to C-plane nodes 105, and/or by a network controller entity, such as for example a Radio Resource Management entity (RRM) (not illustrated).

Before describing in detail how the method and system according to an embodiment of the present invention operates, some preliminary definitions are provided hereinbelow.

Each network node 200(j) of the network 100 is defined by its (two-dimensional or three-dimensional) current coordinates X within the geographical area wherein the network 100 is deployed, and by a mobility parameter M which quantifies the tendency of such network node 200(j) to move within the geographical area wherein the network 100 is deployed. According to an embodiment of the present invention, the mobility parameter M may take the three following values, from the highest to the lowest mobility: Mobile, Nomadic, Fixed. Similar considerations apply with a different number of mobility parameter M values, such as only two (e.g., Mobile and Fixed). Therefore, making reference to a two-dimensional reference system, a network node 200(j) located at coordinates (x(j), y(j)) corresponding to a (fixed) C-plane node 105 may be defined by the tuple 200(j)=[X, M], wherein X=(x(j), y(j)) and M=Fixed.

In this document, by transmission link L(k) (k=1, 2, . . . ) it is intended a link between two network nodes 200(j) to be established for exchanging (user and/or signalling) traffic from one of said two network nodes 200(j) (transmitting node) to the other one (receiving node). A transmission link L(k) is defined by its transmitting node 200(j), by its receiving node 200(j) and by a band type parameter TB specifying the type of transmission band employed by such transmission link L(k). According to an embodiment of the present invention, the band type parameter TB may take one among the three following values: Downlink, Uplink, Common. The band type parameter TB is set to Downlink or Uplink if the transmission technique used is a Frequency Division Duplexing (FDD) technique with a frequency separation between the downlink and uplink transmissions. The band type parameter TB is set to Common if the transmission technique used is a Time Division Duplexing (TDD) with a common transmission band both for the downlink and the uplink transmissions. Therefore, an exemplary transmission link L(1) (see FIG. 2) of the downlink type between network node 200(1) (transmitting node) and network node 200(2) (receiving node) may be defined by the tuple L(1)=[200(1), 200(2), TB], wherein TB=Downlink.

A transmission collision is defined as the situation occurring when the establishment of a new transmission link L(k) between two network nodes 200(j) or the modification of an already existing transmission link L(k) between two network nodes 200(j), generates an extra interference toward at least one neighbour (receiving) network node 200(j) such that at said latter network node 200(j) the following relationship is verified: C/I<T, wherein C is the useful signal power, I is the interference power associated with the extra interference, and T is a predetermined threshold, hereinafter referred to as interference power threshold.

A Resource Sharing Cluster (RSC(n), (n=1, 2, . . . )) comprises a set of transmission links L(k) considered as potentially colliding to each other, so that they require to be properly coordinated to avoid transmission collisions occurrences, such as for example by means of a Time-Division Multiplexing technique or other techniques. An RSC(n) is defined by the set of transmission links L(k) considered as potentially colliding to each other, the band type parameter(s) TB thereof, the coordinates of the centre of gravity CG of the set of transmission links L(k) (obtained for example based on the average values of the coordinates X of all the network nodes 200(j) involved in the set of transmission links L(k)), and a cluster mobility parameter CM equal to the value of the mobility parameter M for all the network nodes 200(j) involved in the set of transmission links L(k) that have the highest mobility. Therefore, an exemplary RSC(n) comprising three transmission links L(1), L(2), L(3) having the Downlink band type parameter TB, with the network nodes 200(j) of the transmission links L(1) and L(3) that have the mobility parameter M equal to Nomadic and the network nodes 200(j) of the transmission link L(2) that have the mobility parameter M equal to Fixed, may be defined by the tuple RSC(n)=[{L(1), L(2), L(3)}, Downlink, CG, CM], wherein CM=Nomadic. According to an embodiment, said data associated with the RSC(n) may be stored and managed by the network 100 locally, such as for example at the network nodes 200(j) corresponding to C-plane nodes 105, and/or by a network controller entity, such as for example in the Radio Resource Management entity. Since in the considered example the network 100 is a decoupled network 100, the data associated with an RSC(n) may be advantageously stored and managed by any computationally powerful enough C-plane node(s) among the ones covering the area in which the centre of gravity CG is located. In case (the centre of gravity CG of) an RSC(n) is moving from the coverage area of a C-plane node to the coverage area of another C-plane node, the data associated with the RSC(n) has to be exchanged from the first C-plane node to the last one.

According to an embodiment of the present invention, data corresponding to the various RSC(n) is updated by taking into account that:

An RSC(n) has to be updated each time a transmission established through a transmission link L(k) comprised in said RSC(n) has been completed (i.e., after the transmission period of the transmission link L(k)). In this case, the updating provides that such transmission link L(k) is deleted from the corresponding RSC(n).

An RSC(n) having the cluster mobility parameter CM equal to Fixed (i.e., comprising only transmission links L(k) whose network nodes 200(j) have the mobility parameters M equal to Fixed) does not need to be updated, since all the network nodes 200(j) involved by said transmission links L(k) do not move.

An RSC(n) having the cluster mobility parameter CM equal to Nomadic (i.e., comprising at least one transmission link L(k) whose network nodes 200(j) have the mobility parameters M equal to Nomadic, and none transmission link L(k) whose network nodes 200(j) have the mobility parameters M equal to Mobile) is periodically updated by periodically updating the transmission links L(k) whose network nodes 200(j) have the mobility parameters M equal to Nomadic. The RSC(n) is also updated each time the coordinates X of at least one network node 200(j) involved by at least one of the transmission links L(k) comprised in said RSC(n) changes.

An RSC(n) having the cluster mobility parameter CM equal to Mobile (i.e., comprising at least one transmission link L(k) whose network nodes 200(j) have the mobility parameters M equal to Mobile) is updated as soon as the coordinates X of at least one network node 200(j) involved by at least one of the transmission links L(k) comprised in said RSC(n) and having the mobility parameters M equal to Mobile changes. According to an embodiment of the present invention, in order to limit the resources required for managing the RSC(n) updating—in terms of computational load, storage space, signalling traffic —, such updating may be carried out only if the distance between the centre of gravity CG of the RSC(n) comprising at least one transmission link L(k) having at least one network node 200(j) that is moving and such network node 200(j) itself is higher than a threshold MR, for example corresponding to the maximum distance reached by a transmission in the mm-wave frequency range. In this way, the RSC(n) is updated only when the moving network node 200(j) is moving away from the area wherein the network nodes 200(j) of the transmission links L(k) of the RSC(n) are located, and not when it is moving within said area.

The location information of an RSC(n) and of the associated network nodes 200(j) (i.e., the coordinates of the centre of gravity CG and the coordinates X of the associated network nodes) may be stored at the same network entity that manages the data associated with the RSC(n), or may be stored at a different network entity. In the latter case, an appropriate protocol relating the concerned information is defined so as to allow the communication of the location information between the network entity that manages the RSC(n) and the other network entity. For example, in case said location information is stored at C-plane nodes 105 of the network 100, an RSC(n) may be managed, in terms of location information updating by a C-plane node 105, while the location information corresponding to some network nodes 200(j) associated to said RSC(n) may be managed by a different C-plane node 105. In this case, a specific communication protocol is implemented to allow the communication between said two C-plane nodes 105.

Figure 3:
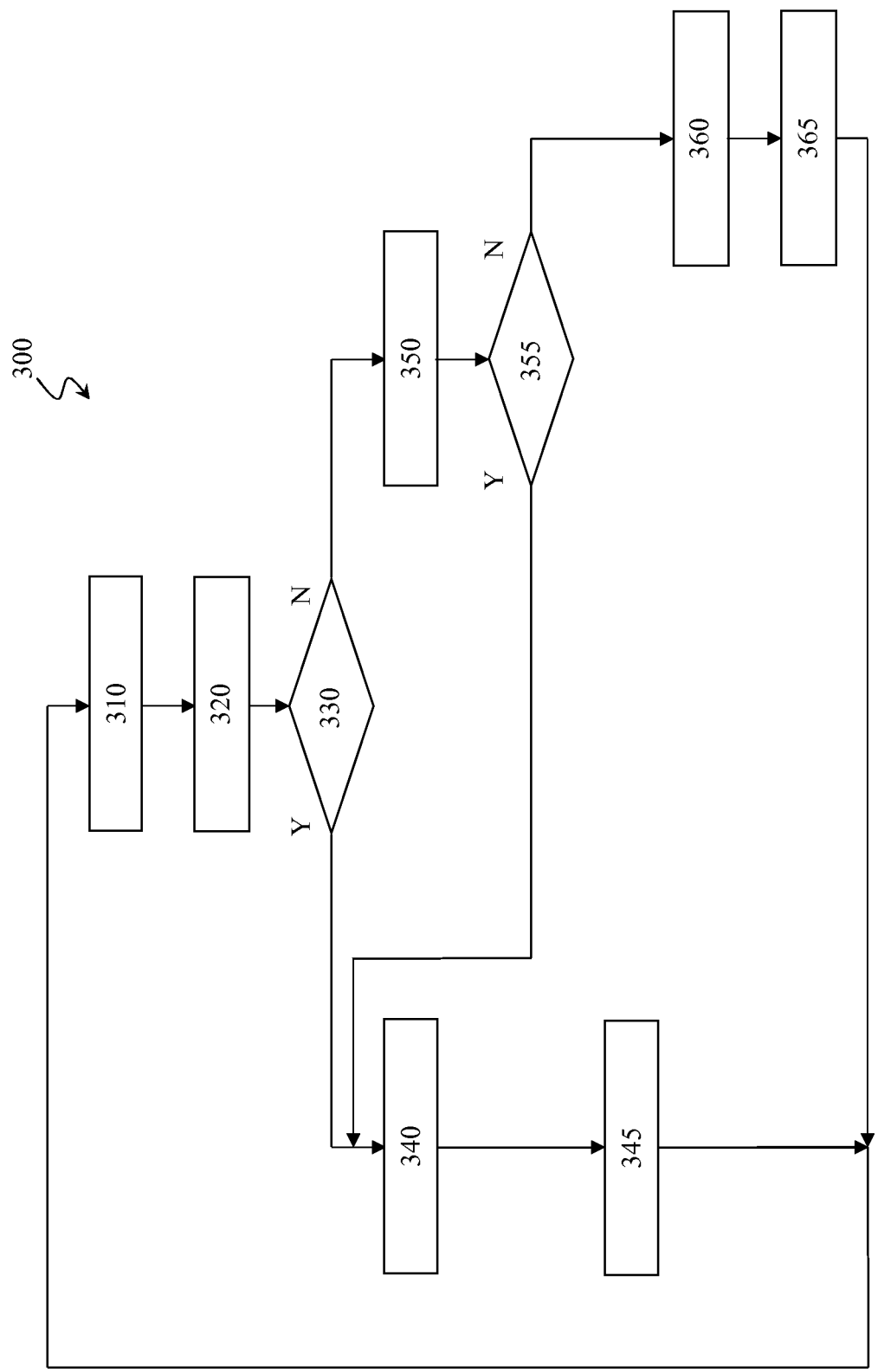
FIG. 3 illustrates in terms of functional blocks the main phases of a method for managing the network illustrated in FIGS. 1 and 2 according to an embodiment of the present invention.

FIG. 3 illustrates in terms of functional blocks the main phases of a method 300 for managing the network 100 which allows to try avoiding (or at least reducing) transmission collisions prior to a new millimeter wave transmission in a cellular network by means of a geometrical analysis according to an embodiment of the present invention.

According to an embodiment of the present invention, the method 300 is performed by a controller module, which may be a central network controller entity (that can be also virtualized) of the network 100, such as the RRM entity, or may be a local network controller entity, such as comprising a set of C-plane nodes 105 of the network 100.

The first phase (block 310) of the method 300 according to an embodiment of the present invention is carried out in response to the assessment of a new transmission link L'(k) to be activated. This phase provides for retrieving the following information:

which network node 200(j) is the transmitting node (identified as TXN') of the transmission link L'(k);
which network node 200(j) is the receiving node (identified as RXN') of the transmission link L'(k);
the band type parameter TB of the transmission link L'(k);
the coordinates X=(x(tx'), y(tx')) of the transmitting node TXN' of the transmission link L'(k);
the coordinates X=(x(rx'), y(rx')) of the receiving node RXN' of the transmission link L'(k);
the mobility parameter M of the transmitting node TXN' of the transmission link L'(k);
the mobility parameter M of the receiving node RXN' of the transmission link L'(k).

The second phase (block 320) of the method 300 according to an embodiment of the present invention, provides for the generation of a list CL of candidate RSC(n) comprising transmission links L(k) that may interfere with the transmission link L'(k), and which therefore may potentially cause a transmission collision. According to an embodiment of the present invention, the list CL is generated by comparing the band type parameter TB of the transmission link L'(k) with the band type parameter TB of the RSC(n) and by comparing the distance between the center of gravity CG of the RSC(n) and the coordinates X=(x(tx'), y(tx')) of the transmitting node TXN' of the transmission link L'(k) with the threshold MR corresponding to the maximum distance that can be reached by a transmission in the mm-wave frequency range.

According to an embodiment of the present invention, an RSC(n) is selected to be a candidate RSC(n) and inserted in the list CL if the two following conditions are both fulfilled:

the band type parameter TB of the transmission link L'(k) is equal to the band type parameter TB of said RSC(n), and
the distance between the center of gravity CG of said RSC(n) and the coordinates X=(x(tx'), y(tx')) of the transmitting node TXN' of the transmission link L'(k) are equal to or lower than two times the threshold MR.

This means that the list CL of candidate RSC(n) comprising transmission links L(k) that may potentially interfere with the transmission link L'(k) only comprises RSC(n) including transmission links L(k) that are sufficiently close to the transmitting node TXN' of the transmission link L'(k), and that at the same time employ the same type of transmission band employed by such transmission link L'(k).

Similar considerations apply in case the list CL is generated based on the band type parameter TB only.

If the list CL of candidate RSC(n) is empty (exit branch Y of block 330), meaning that currently there is no transmission link L(k) that may interfere with the new transmission link L'(k) to be activated, and therefore that there is no potential transmission collision, a new RSC(n) is created containing the transmission link L'(k) (block 340). Such new RSC(n) will comprise only the new transmission link L'(k), will have a centre of gravity CG having the following coordinates ((x(tx')+(x(rx'))/2), (y(tx')+(y(rx'))/2)), will have a cluster mobility parameter CM equal to the mobility parameter M having the highest mobility among the mobility parameters M of the transmitting node TXN' and of the receiving node RXN' and will have a band type TB equal to the band type TB of L'(k).

At this point, the available mm-wave band is assigned for serving the transmission link L'(k), and the transmission link L'(k) is actually activated by exploiting the assigned available mm-wave band (block 345).

If instead the list CL of candidate RSC(n) is not empty (exit branch N of block 330), according to an embodiment of the present invention a geometrical analysis is carried out for identifying possible transmission collisions between the new transmission link L'(k) and all the transmission links L(k) of the candidate RSC(n) included in the list CL (block 350).

For this purpose, for each candidate RSC(n) included in the list CL, each transmission link L(k) belonging to the candidate RSC(n) is geometrically compared with the transmission link L'(k) so as to search for potential transmission collision among the network nodes involved by such pair of transmission links. For example, having a candidate RSC (n)=[{L(1), L(2), L(3), . . . }, Downlink, CG, CM], the geometrical comparison provides for evaluating for each transmission link L(1), L(2), L(3), . . . whether the transmitting node TXN' of the transmission link L'(k) interferes with the receiving node of the transmission link L(1), L(2), L(3) . . . , and whether the transmitting node of the transmission link L(1), L(2), L(3) . . . interferes with the receiving node RXN' of the transmission link L'(k). Such geometrical comparison according to an embodiment of the present invention will be described in greater detail in the following of the present description. If at least one potential transmission collision is found in the considered candidate RSC(n)—for example between the transmission link L'(k) and the transmission link L(2)—the search carried out for that particular candidate RSC(n) is terminated—i.e., the transmission link L(3) is not compared with the transmission link L'(k)—and said candidate RSC(n) is inserted in a further list MCL.

If no potential transmission collision is found in any candidate RSC(n) of the list CL, i.e., if the list MCL is empty after having performed the geometrical comparison between the transmission link L'(k) and the transmission links L(k) of all the candidate RSC(n) of the list CL, (exit branch Y of block 355), a new RSC(n) is created containing the transmission link L'(k) (block 340), the available mm-wave band is assigned for serving the transmission link L'(k), and the transmission link L'(k) is actually activated by exploiting the assigned available mm-wave band (block 345).

If instead the list MCL comprises at least one RSC(n), meaning that at least one candidate RSC(n) comprises a transmission link L(k) that has been assessed by means of the geometrical comparison to generate a potential transmission collision (exit branch N of block 355), the method 300 according to an embodiment of the present invention provides for inserting the transmission link L'(k) in the RSC(n) listed in the list MCL (block 360).

According to an embodiment of the present invention, the insertion of the transmission link L'(k) in the RSC(n) of the list MCL is carried out in the following way. For each RSC(n) of the list MCL, an evaluation procedure is carried out directed to assess whether said RSC(n) has enough resources to include the transmission link L'(k) without having an unacceptable performance degradation of one of its transmission links L(k) or of the transmission link L'(k) itself. According to an embodiment of the present invention, such evaluation procedure may take into account the available resources limits of the RSC(n), service level agreements and/or QoS policies for the transmission link L'(k) and for the transmission links L(k) of the RSC(n), possibly in conjunction with the transmission type of the transmission link L'(k) and of the transmission links L(k) of the RSC(n). As a non-limitative example, such evaluation procedure may provide for comparing the number of the transmission links L(k) already comprised in the RSC(n) and a fixed maximum threshold MAX. If the evaluation procedure has a positive outcome, i.e., if the RSC(n) has been assessed to have enough resources to include the transmission link L'(k) without having an unacceptable performance degradation of one of its transmission links L(k) or of the transmission link L'(k) itself, the RSC(n) is selected and the transmission link L'(k) is inserted in the selected RSC(n).

In case the evaluation procedure has provided negative outcomes for all the RSC(n) included in the list MCL, meaning that an unacceptable performance degradation is foreseen, at least one among the following action can be taken:

in case the network 100 is a heterogeneous network, i.e., in which network nodes are equipped with hardware designed to carry out transmissions both at the mm-wave frequency range and at lower frequencies, the transmission link L'(k) or one of the transmission links L(k) of one of the RSC(n) included in the list MCL may be assigned a lower frequency (i.e., one of the frequencies used by 4G generation networks, such as an LTE-A link at 2.6 GHz);

in case all the network nodes involved in the activation of the transmission link L'(k) have the mobility parameters M equal to Mobile, a random postponement of the transmission may be applied, looking for more favourable conditions of the network 100 due to new positions of the network nodes (returning back to block 310).

in case the transmission link L'(k) has gateway/backhauling purposes for a group of network nodes, an alternative network node may be chosen (in this case, the foreseen transmission will not take place and a new analysis will be performed on another transmission link involving such alternative network node) (returning back to block 310).

In the unlikely event of a multiple insertion of the transmission link L'(k) in more than one RSC(n) (for example, when a transmission link L'(k) creates a bridge between two or more RSC(n)), a coordination of the resource sharing mechanisms of said RSC(n) may be provided (e.g., prioritize the assignment of the same share of resource over all the involved RSC(n)). Alternatively, said more than one RSC(n) may be integrated so as to form a single RSC(n).

Returning back to the FIG. 3, in case the evaluation procedure has given a positive outcome, the available mm-wave band is assigned to the transmission link L'(k) by sharing it with the transmission links L(k) of the selected RSC(n), and the transmission link L'(k) is actually activated by exploiting the assigned available mm-wave band (block 365). As a non-limitative example, the sharing of the available mm-band among the transmission links of the selected RSC(n) may be carried out through a time-division multiplexing scheme. Similar considerations apply in case a different scheme is adopted.

Once the mm-wave band has been assigned to the transmission link L'(k) and the transmission link L'(k) is actually activated (i.e., after block 345 or after block 365), the method 300 provides for waiting for the assessment of a further new transmission link L'(k) to be activated (returning back to block 310).

In order to describe in detail the geometrical analysis carried out at block 350 of the method 300 according to an embodiment of the present invention, reference will be now made to FIGS. 4A-4D, illustrating four different cases that may occur when the transmission link L'(k) is geometrically compared with a transmission link L(k) for assessing whether the transmitting node TXN' of the transmission link L'(k) interferes with the receiving node (identified as RXN) of the transmission link L(k). In FIGS. 4A-4D, the transmitting node of the transmission link L(k) is identified as TXN.

According to an embodiment of the present invention, the geometrical comparison comprises the following phases.

The first phase of the geometrical comparison provides for calculating:
the distance d between the receiving node RXN of the transmission link L(k) and the straight line connecting the transmitting node TXN' with the receiving node RXN';
the angle α between the straight line connecting the transmitting node TXN' and the receiving node RXN' and the straight line connecting the transmitting node TXN' with the receiving node RXN;
the distance s between the transmitting node TXN' and a projection x of the receiving node RXN on the straight line connecting the transmitting node TXN' with the receiving node RXN'.

For example, according to an embodiment of the present invention, being X=(x(tx'), y(tx')) the coordinates of the transmitting node TXN', X=(x(rx'), y(rx')) the coordinates of the receiving node RXN', X=(x(tx), y(tx)) the coordinates of the transmitting node TXN, X=(x(rx), y(rx)) the coordinates of the receiving node RXN:
the slope m' of the straight line connecting the transmitting node TXN' with the receiving node RXN' may be calculated as m'=(y(rx')−y(tx'))/(x(rx')−x(tx'));
the distance d may be calculated as $$d = \frac{|y(rx) - (m'(x(rx) - x(tx')) + y(tx'))|}{\sqrt{1 + m'^2}};$$

the slope m of the straight line connecting the transmitting node TXN' with the receiving node RXN may be calculated as m=(y(rx)−y(tx'))/(x(rx)−x(tx'));
the angle α may be calculated as $$\alpha = \arctan\left(\left|\frac{m' - m}{1 + m'm}\right|\right);$$

the distance s may be calculated as s=d cot(α).

The second phase of the geometrical comparison provides for calculating an interference distance threshold IDT corresponding to the minimum value the distance d may assume to avoid that the transmitting node TXN' interferes with the receiving node RXN. According to an embodiment of the present invention, the interference distance threshold IDT is calculated by taking into account:
the distance s;
the position of the projection x on the straight line connecting the transmitting node TXN' and the receiving node RXN', i.e., whether the projection x belongs to the half-line including the receiving node RXN' (corresponding to α≤90° or to the half-line that does not include the receiving node RXN' (corresponding to α>90°);

the directivity of the antenna of the transmitting node TXN';

the directivity of the antenna of the receiving node RXN;

the transmission power, as well as other specific radio parameters (e.g., radiation pattern and sensitivity) of the transmitting node TXN' and of the receiving node RXN;

safety margins determined by technology constraints (e.g., non-ideal radiation pattern) and type of environment (presence of obstacles or canyons).

For example, according to an embodiment of the present invention, given an interference power threshold T (i.e., the threshold under which the ratio between the useful signal power C and the interference power I associated to the extra interference caused by the transmitting node TXN' toward the receiving node RXN generates a transmission collision), the interference distance threshold IDT may be calculated in the following way.

Under the assumption that the network 100 is designed to operate so that the power of the signal received by a generic network node 200(j) (such as the receiving nodes RXN' and RXN) is substantially of the optimal (e.g., highest) amplitude—meaning that the power of the signal radiated by the transmitting node TXN' has the required useful signal C at a distance rl equal to the distance between the transmitting node TXN' itself and the receiving node RXN'—, the power variation ΔP of the signal radiated by the transmitting node TXN' at the receiving node RXN with respect to the power level of the signal radiated by the same transmitting node TXN' at the receiving node RXN' may be calculated (in dB) by the following formula:

$$\Delta P = 10\log\left(\frac{rl^2}{(s/\cos(\alpha))^2}\right).$$

Moreover, being γ the angle of the main lobe of the antenna of the transmitting node TXN', the portion d' of the distance d which is intersected by the main lobe—i.e., the portion of the segment of length d connecting the receiving node RXN of the transmission link L(k) and the straight line connecting the transmitting node TXN' with the receiving node RXN' which is subtended by the angle γ/2—is equal to d'=s tan (γ/2).

Furthermore, with Front-Back-Ratio it is defined the power variation FBR (in dB) between the transmission gain of the main lobe of the antenna of the transmitting node TXN' and its side lobes, and a circle whose radius R is determined by the interference power threshold T so that $$-\left(10\log\left(\frac{rl^2}{R^2}\right) - FBR\right) = T.$$

Figure 4A:
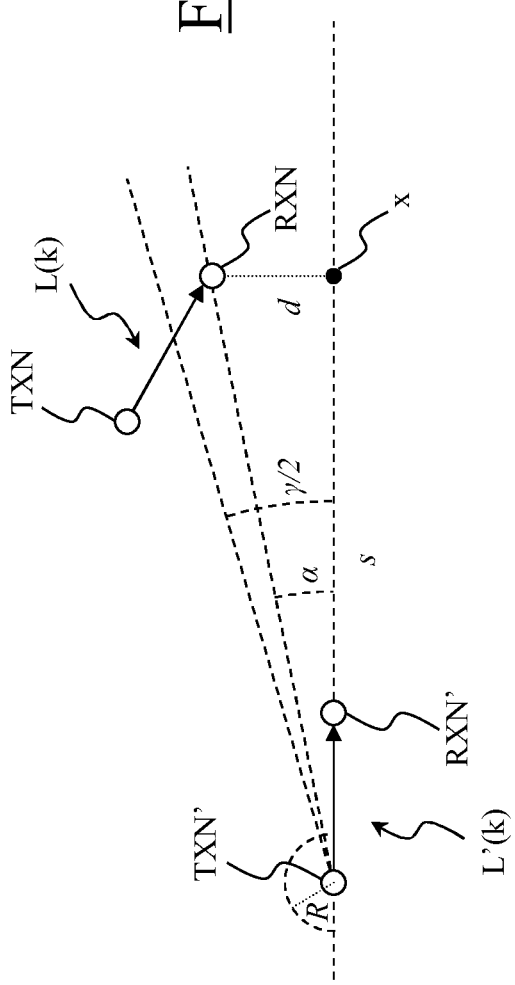
Figure 4B:
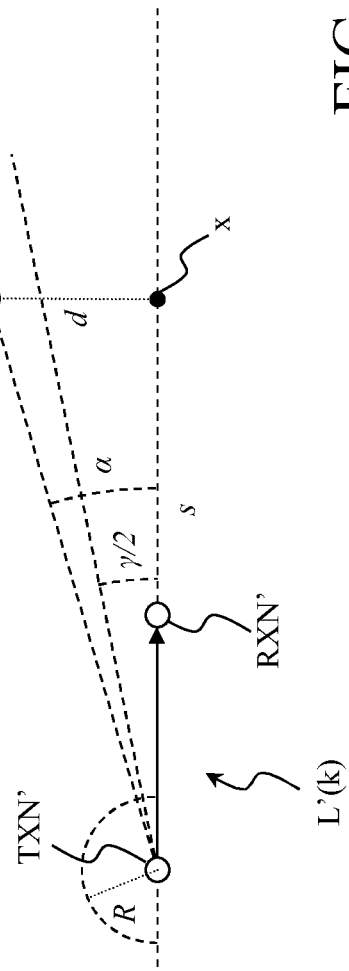

Based on the above assumptions, the interference distance threshold IDT may be calculated in the following way:

1) for all the distances s such that s>R cos(γ/2) and at the same time $$-10\log\left(\frac{rl^2}{\left(\frac{s}{\cos(\alpha)}\right)^2}\right) > T,$$

the interference distance threshold IDT is equal to 0 (see FIG. 4A);

2) for all the distances s such that s>R cos(γ/2) and at the same time $$-10\log\left(\frac{rl^2}{\left(\frac{s}{\cos(\alpha)}\right)^2}\right) \leq T,$$

the interference distance threshold IDT is equal to d'=s tan (γ/2) (see FIG. 4B);

3) for all the distances s such that −R≤s≤R cos (γ/2), the interference distance threshold IDT is equal to R sin(α) (see FIG. 4C);

4) for all the distances s such that s<−R, the interference distance threshold IDT is equal to 0 (see FIG. 4D).

The third phase of the geometrical comparison provides for comparing the actual distance d (between the receiving node RXN of the transmission link L(k) and the straight line connecting the transmitting node TXN' with the receiving node RXN') with the interference distance threshold IDT calculated at the previous phase. If d<IDT, a potential transmission collision between the transmission link transmission link L(k) and the transmission link L'(k) is assessed. Otherwise, if d≥IDT, the transmission link L'(k) is assessed not to cause a potential transmission collision with the transmission link L(k).

In other words, according to an embodiment of the present invention, the geometrical comparison provides for modelling the radiation pattern of the antenna of the transmitting node TXN' as comprising a main lobe area included in the area subtended by the angle γ, and a side lobe area defined by the area encircled by the circle of radius R, and then evaluating the position of the receiving node RXN with respect to said radiation pattern.

In the scenario illustrated in FIG. 4A, even if the receiving node RXN is located within the area subtended by the angle γ, the receiving node RXN is at a distance $$\frac{s}{\cos(\alpha)}$$

from the transmitting node TXN' sufficiently high that the power of the signal radiated from the transmitting node TXN' at the receiving node RXN is so low that cannot generate interference. This scenario corresponds to case 1) of the second phase of the geometrical comparison, in which the interference distance threshold IDT is equal to 0, meaning that the distance of the receiving node RXN from the transmitting node TXN' is so high that even if the receiving node RXN is within the area subtended by the angle γ and exactly located on the straight line connecting the transmitting node TXN' with the receiving node RXN' (i.e., d=0), the outcome of the comparison between d and IDT carried out at the third phase of the geometrical comparison is always d≥IDT.

In the scenario illustrated in FIG. 4B, even if the receiving node RXN is at a distance $$\frac{s}{\cos(\alpha)}$$

from the transmitting node TXN' sufficiently high that the power of the signal radiated from the transmitting node TXN' at the receiving node RXN may be sufficient to generate interference, the receiving node RXN is located outside the area subtended by the angle γ. This scenario corresponds to case 2) of the second phase of the geometrical comparison, in which the interference distance threshold IDT is equal to d'=s tan (γ/2). In the illustrated scenario, d≥IDT=d'=s tan (γ/2), meaning that the receiving node RXN is located outside the area subtended by the angle γ, and therefore no interference is envisaged. If instead the receiving node RXN was located at a distance d lower than IDT, meaning that the receiving node RXN is located inside the area subtended by the angle γ, potential interference would be envisaged caused by signal radiated at main lobe of the radiation pattern.

In the scenario illustrated in FIG. 4C, the receiving node RXN is located sufficiently close to the transmitting node TXN' that the distance s between the transmitting node TXN' and the projection x of the receiving node RXN on the straight line connecting the transmitting node TXN' with the receiving node RXN' falls within the side lobe area defined by the area encircled by the circle of radius R. This scenario corresponds to case 3) of the second phase of the geometrical comparison, in which the interference distance threshold IDT is equal to R sin(α). In the illustrated scenario, d≥IDT=R sin(α), meaning that the receiving node RXN is located outside the area encircled by the circle of radius R, and therefore no interference is envisaged. If instead the receiving node RXN was located at a distance d lower than IDT, meaning that the receiving node RXN is located inside the area subtended by the encircled by the circle of radius R, potential interference would be envisaged caused by signal radiated at side lobes of the radiation pattern.

In the scenario illustrated in FIG. 4D, the receiving node RXN is located in a portion of space that is both opposite to the one wherein the main lobe is radiated, and sufficiently far from the transmitting node TXN' to be outside the side lobe area encircled by the circle of radius R. This scenario corresponds to case 4) of the second phase of the geometrical comparison, in which the interference distance threshold IDT is equal to 0, so that the outcome of the comparison between d and IDT carried out at the third phase of the geometrical comparison is always d≥IDT. This means that the receiving node RXN is in a location that is not reached by the radiation pattern of the transmitting node TXN' antenna, and therefore no interference is envisaged.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

For example, although in the present description reference has been mainly made to a two-dimensional scenario, similar considerations apply to a three-dimensional scenario. In this case, the formulas described above can be easily adapted to a three-dimensional coordinate system.

Moreover, even if reference has been made to a network 100 of the decoupled type, the concepts of the present invention directly apply also to the case of a current cellular network in which the network nodes 200(j) of the network 100 manage both signalling and user plane information as a single entity.

The invention claimed is:

1. A method for assigning frequency bands on a cellular network deployed in a geographical area, the cellular network including a plurality of network nodes each including at least one antenna having a corresponding radiation pattern and configured to activate transmission links between pairs of corresponding transmitting and receiving network nodes to exchange traffic, the method comprising, in response to assessment of a new transmission link to be activated between a first network node and a second network node:
   retrieving an indication of coordinates of the first and second network nodes within the geographical area;
   retrieving an indication of resource sharing clusters of the cellular network, each resource sharing cluster comprising a group of transmission links considered as potentially causing transmission collisions to each other;
   selecting a set of the resource sharing clusters according to a comparison of the coordinates of the first network node with the coordinates of each of pairs of the transmitting and receiving network nodes corresponding to the transmission links of the resource sharing clusters and according to a band-type parameter of the transmission links of the resource sharing cluster;
   if the selected set of resource sharing clusters is not empty, carrying out a)-c):
   a) identifying possible transmission collisions between the new transmission link and the transmission links of the selected set of resource sharing clusters, wherein each of the possible collisions is identified in response to a distance, between the first network node and a straight line connecting each of the pairs of transmitting and receiving nodes corresponding to the transmission links of the resource sharing cluster, being less than an interference distance threshold;
   b) assigning one of the frequency bands to the new transmission link according to the identification of the possible transmission collisions;
   c) activating the new transmission link by exploiting the assigned frequency band; and
   if the selected set of resource sharing clusters is empty, generating a new resource sharing cluster comprising the new transmission link.

2. The method of claim 1, wherein if the selected set of resource sharing clusters is not empty, and a possible transmission collision is identified between the new transmission link and a transmission link of a selected resource sharing cluster of the selected set of resource sharing clusters, the method further comprises inserting the new transmission link in the selected resource sharing cluster.

3. The method of claim 1, wherein, if the selected set of resource sharing clusters is not empty, and a possible transmission collision is identified between the new transmission link and a transmission link of a selected resource sharing cluster of the selected set of resource sharing clusters, the assigning one of the frequency bands to the new transmission link comprises assigning the frequency band by sharing it with the transmission links of the selected resource sharing cluster.

4. The method of claim 1, wherein, if the selected set of resource sharing clusters is not empty, but no possible transmission collision is identified the method further comprises generating a new resource sharing cluster comprising the new transmission link.

5. The method of claim 4, wherein if the selected set of resource sharing clusters is empty or if the selected set of resource sharing clusters is not empty, but no possible transmission collision is identified, the method further comprises:
   assigning an available frequency band among the frequency bands to the new transmission link; and
   activating the new transmission link by exploiting the assigned frequency band.

6. The method of claim 1, further comprising calculating the interference distance threshold based on:
   a second distance between the first network node and a projection of the receiving node corresponding to the transmission link on the straight line connecting the first network node and the second network node;
   a directivity of the antenna of the first network node;
   a directivity of the antenna of the receiving node corresponding to the transmission link.

7. The method of claim 1, wherein the frequency bands comprise at least one frequency band corresponding to mm-wave frequency range.

8. The method of claim 1, wherein the network nodes of the plurality of network nodes comprise fixed transceiver stations and mobile user equipment.

9. A cellular network deployed in a geographical area, comprising:
   a plurality of network nodes each including at least one antenna having a corresponding radiation pattern and configured to activate transmission links between pairs of corresponding transmitting and receiving network nodes to exchange traffic;
   a controller module configured to carry out the following sequence of operations in response to the assessment of a new transmission link to be activated between a first network node and a second network node:
      retrieving an indication of coordinates of the first and second network nodes within the geographical area;
      retrieving an indication of resource sharing clusters of the cellular network, each resource sharing cluster comprising a group of transmission links considered as potentially causing transmission collisions to each other;
      selecting a set of the resource sharing clusters according to a comparison of the coordinates of the first network node with the coordinates of the transmitting and receiving network nodes corresponding to the transmission links of the resource sharing clusters and according to a band-type parameter of the transmission links of the resource sharing cluster;
      if the selected set of resource sharing clusters is not empty, carrying out a)-c):
      a) identifying possible transmission collisions between the new transmission link and the transmission links of the selected set of resource sharing clusters, wherein each of the possible collisions is identified in response to a distance, between the first network node and a straight line connecting each of the pairs of transmitting and receiving nodes corresponding to the transmission links of the resource sharing cluster, being less than an interference distance threshold;
      b) assigning one of the frequency bands to the new transmission link according to the identification of the possible transmission collisions;
      c) activating the new transmission link by exploiting the assigned frequency band, and
      if the selected set of resource sharing clusters is empty, generating a new resource sharing cluster comprising the new transmission link.

* * * * *